(12) United States Patent
Dallan (10) Patent No.: US 11,819,947 B2
(45) Date of Patent: Nov. 21, 2023

(54) APPARATUS FOR LASER OR PLASMA CUTTING OF PIECES OF LAMINAR MATERIAL

(71) Applicant: DALLAN S.p.A., Castelfranco Veneto (IT)

(72) Inventor: Sergio Dallan, Castelfranco Veneto (IT)

(73) Assignee: DALLAN S.P.A., Treviso (IT)

( * ) Notice: Subject to any disclaimer, the term of this patent is extended or adjusted under 35 U.S.C. 154(b) by 283 days.

(21) Appl. No.: 16/599,440

(22) Filed: Oct. 11, 2019

(65) Prior Publication Data

US 2020/0114472 A1 Apr. 16, 2020

(30) Foreign Application Priority Data

Oct. 12, 2018 (IT) .................. 102018000009406

(51) Int. Cl.
*B23K 26/38* (2014.01)
*B23K 10/00* (2006.01)
*B23K 37/04* (2006.01)

(52) U.S. Cl.
CPC .............. *B23K 26/38* (2013.01); *B23K 10/00* (2013.01); *B23K 37/04* (2013.01)

(58) Field of Classification Search
CPC ........ B23K 26/38; B23K 10/00; B23K 37/04; B23K 26/127; B23K 37/006;
(Continued)

(56) References Cited

U.S. PATENT DOCUMENTS 4,335,296 A 6/1982 Bredow
6,164,525 A * 12/2000 Isoyama .............. B23K 37/047
229/5.7
(Continued)

FOREIGN PATENT DOCUMENTS

AT 515839 12/2015
CN 201483157 5/2010
(Continued)

OTHER PUBLICATIONS

Italian Search Report for IT201800009406, dated Jun. 6, 2019, 2 pages.
(Continued)

*Primary Examiner* — John J Norton
*Assistant Examiner* — Franklin Jefferson Wang
(74) *Attorney, Agent, or Firm* — McAndrews, Held & Malloy, Ltd.

(57) ABSTRACT

The present invention concerns an apparatus for laser or plasma cutting of pieces of laminar material, comprising a cutting station, comprising a first support structure and at least a laser or plasma cutting head which is associated with the first support structure and which is movable in relation thereto within an operating area; and a positioning element for positioning at least a portion of the laminar material in the operating area on a cutting plane. The positioning element may consist of a conveyor belt of the spike bed type. The apparatus may further comprise a first closing device suitable to close a first opening into the operating area and a second closing device suitable to close a second opening of the operating area. The positioning element may be associated with a second support structure independent of the first support structure. The first and second closing devices may also be associated with a support structure that is independent of the first support structure.

9 Claims, 5 Drawing Sheets

(58) Field of Classification Search
CPC .............. B23K 37/0241; B23K 26/706; B23K 26/702; B26D 5/00
See application file for complete search history.

(56) References Cited

U.S. PATENT DOCUMENTS

| | | | |
|---|---|---|---|
| 6,639,176 B1* | 10/2003 | Urech | B23K 26/0838 |
| | | | 219/121.68 |
| 2006/0187683 A1 | 8/2006 | Hsieh et al. | |
| 2007/0235423 A1* | 10/2007 | Bornemann | B25H 3/006 |
| | | | 219/121.39 |
| 2008/0173830 A1* | 7/2008 | Pieger | B23K 26/127 |
| | | | 250/515.1 |
| 2008/0197118 A1* | 8/2008 | Gattiglio | B23K 26/21 |
| | | | 219/121.63 |
| 2010/0043514 A1* | 2/2010 | Holmquist | B23K 26/38 |
| | | | 219/121.72 |
| 2011/0290767 A1* | 12/2011 | Muscat-Tyler | B23K 10/006 |
| | | | 219/121.44 |
| 2012/0256547 A1 | 10/2012 | Yang | |
| 2013/0305760 A1 | 11/2013 | Shinomoto et al. | |
| 2013/0313059 A1 | 11/2013 | Inarida et al. | |
| 2014/0035492 A1 | 2/2014 | Ahmed et al. | |
| 2015/0173641 A1 | 6/2015 | Osorio et al. | |
| 2015/0273641 A1* | 10/2015 | Mabee | B23Q 7/035 |
| | | | 219/121.86 |
| 2016/0214207 A1* | 7/2016 | Okazaki | B23K 26/0846 |
| 2016/0297036 A1* | 10/2016 | Schmauder | B23K 37/0408 |
| 2017/0057008 A1* | 3/2017 | Liu | G02B 7/04 |
| 2017/0343979 A1 | 11/2017 | Shigematsu | |
| 2018/0138853 A1 | 5/2018 | Tseng et al. | |
| 2019/0036462 A1 | 1/2019 | Tazaki et al. | |

FOREIGN PATENT DOCUMENTS

| | | | |
|---|---|---|---|
| CN | 103056528 | | 4/2013 |
| CN | 104400234 | | 3/2015 |
| CN | 105829015 | | 8/2016 |
| CN | 205702869 | | 11/2016 |
| CN | 205702869 U | * | 11/2016 |
| CN | 108526731 A | * | 9/2018 |
| EP | 2540435 | | 1/2013 |
| EP | 3342532 | | 7/2018 |
| JP | 2013086144 | | 5/2013 |
| JP | 3210066 U | | 4/2017 |
| RU | 2288825 | | 12/2006 |
| RU | 86129 | | 8/2009 |
| RU | 87381 | | 10/2009 |
| RU | 2463246 | | 10/2012 |
| WO | 2017129860 | | 8/2017 |

OTHER PUBLICATIONS

Chinese Search Report for CN201910966641.5, dated Aug. 22, 2022, 8 pages.
Extended European Search Report for EP19198991, completed Feb. 12, 2020, 5 pages.
Russian Search Report for Russian Appln. No. 2019131844/05, completed Oct. 24, 2022, 8 pages.

* cited by examiner

APPARATUS FOR LASER OR PLASMA CUTTING OF PIECES OF LAMINAR MATERIAL

This application claims priority under 35 U.S.C. 119 to Italian Patent Application No. 102018000009406, filed on Oct. 12, 2018, the entirety of which is incorporated by reference herein.

FIELD OF THE INVENTION

The subject-matter of the present invention is an apparatus for laser or plasma cutting of pieces from laminar material.

Advantageously, the cutting apparatus according to the invention may be used to process both laminar material wound in a coil and laminar material in the form of individual sheets.

BACKGROUND

Devices for laser or plasma cutting of pieces of laminar material M are known, wherein, during the cutting step, the laminar material is placed on a movable support structure, consisting of a conveyor belt defined by rods transverse to the direction of advancement of the belt and spaced apart from each other. Each rod has a row of protruding points on which the laminar material rests. This type of conveyor belt is called a spike bed ("fakir's bed") and prevents the laminar material from being burned in the areas of contact between the material and the movable support. During the cutting step, the machining swarf (which is normally small or very small) slips into the empty spaces of the spike bed and is thus separated from the machined pieces and the skeleton (i.e. the laminar material with the machined pieces and swarf removed) already during the cutting step. The swarf is thus already collected in the area below the cutting area within a so-called cutting station, while the machined pieces and skeleton continue to travel together on the spike bed to be transported to a collection station downstream, outside of the cutting area.

Figure 1:
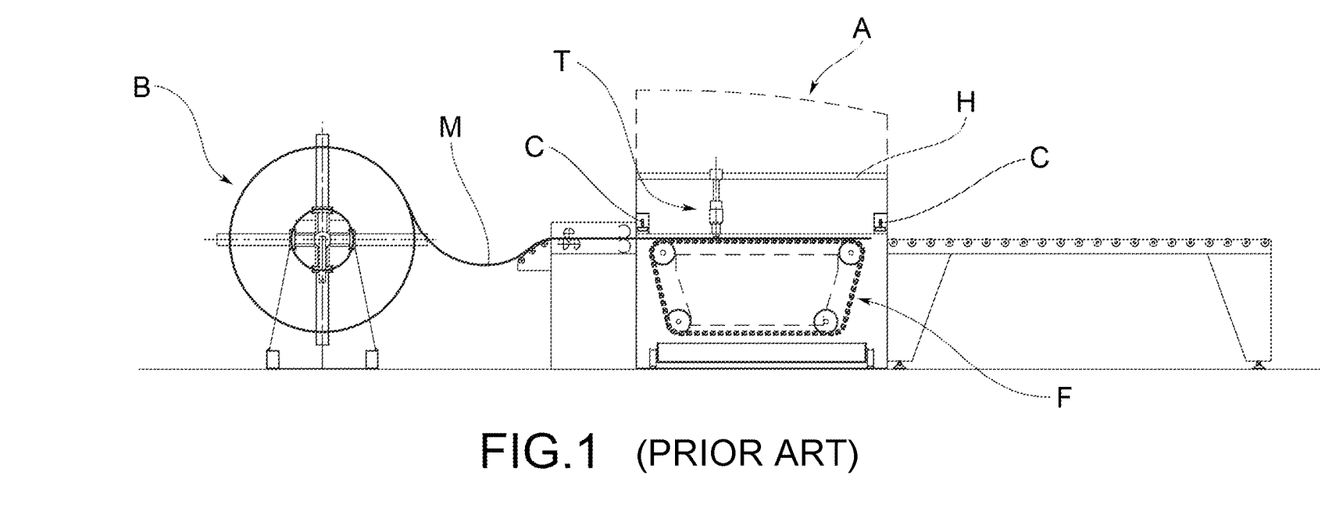
FIGS. 1 and 2 show two orthogonal schematic views, respectively in elevation and from above, of an apparatus of a known type for laser or plasma cutting of pieces of sheet material wound in a coil, equipped with a spike bed.
Figure 2:
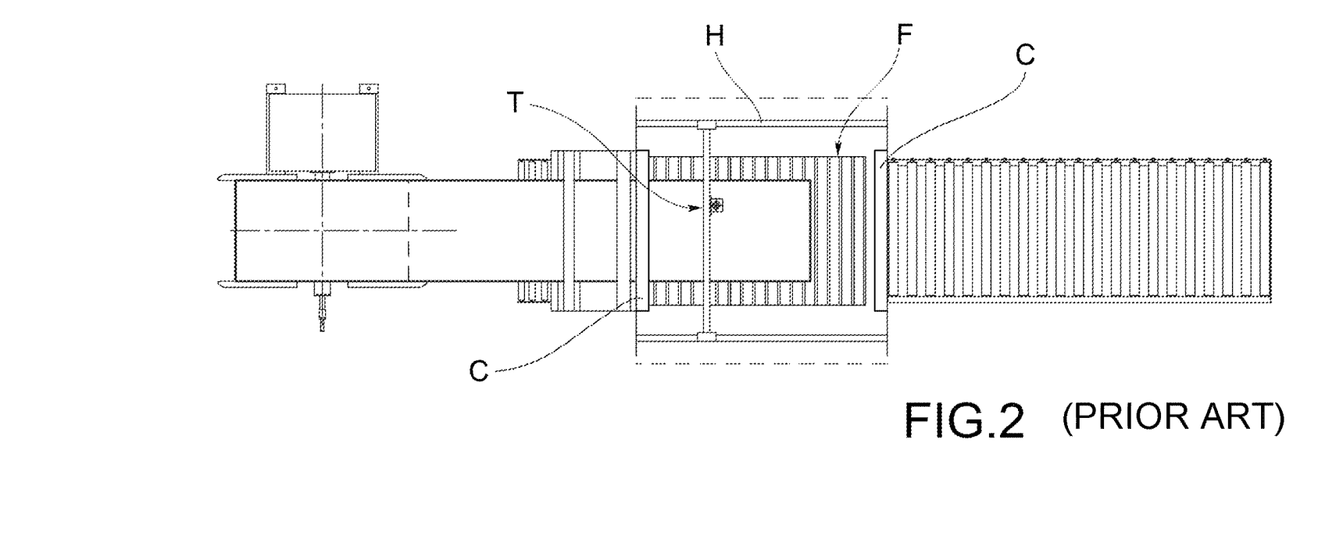
Figure 3:
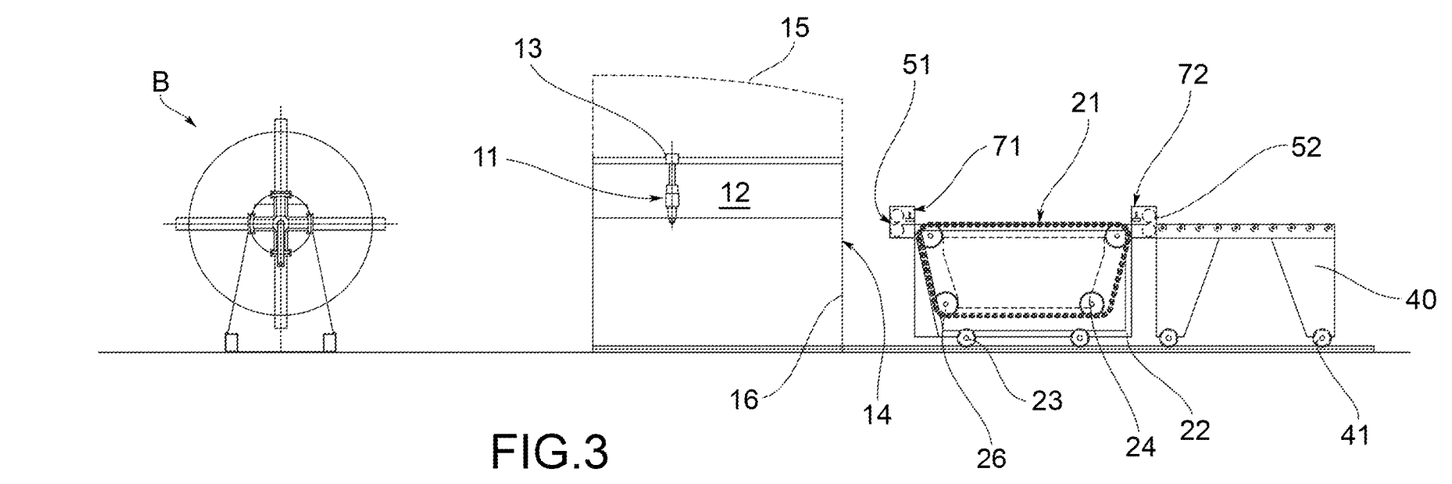
FIGS. 3 and 4 show, respectively, a schematic orthogonal view in elevation and from above of an apparatus for laser or plasma cutting of pieces of laminar material according to a first embodiment of the present invention, illustrated in a configuration with the spike bed extracted from the cutting station.
Figure 4:
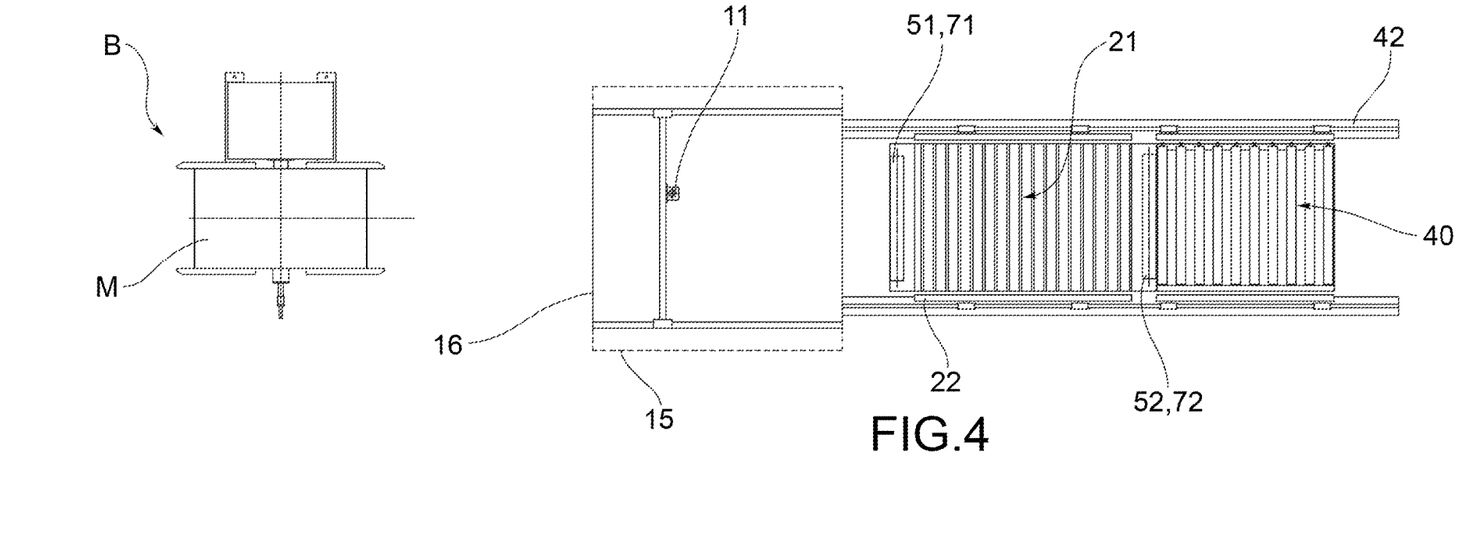
Figure 5:
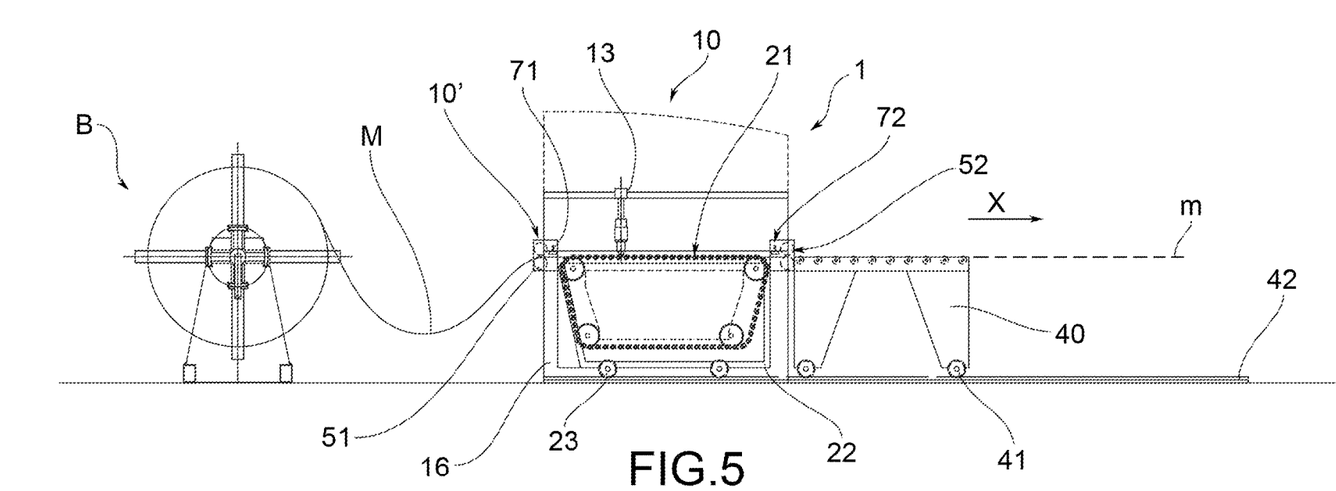
FIGS. 5 and 6 show, respectively, a schematic orthogonal view in elevation and from above of the apparatus illustrated in FIGS. 3 and 4 in a configuration with a spike bed inserted in the cutting station.
Figure 6:
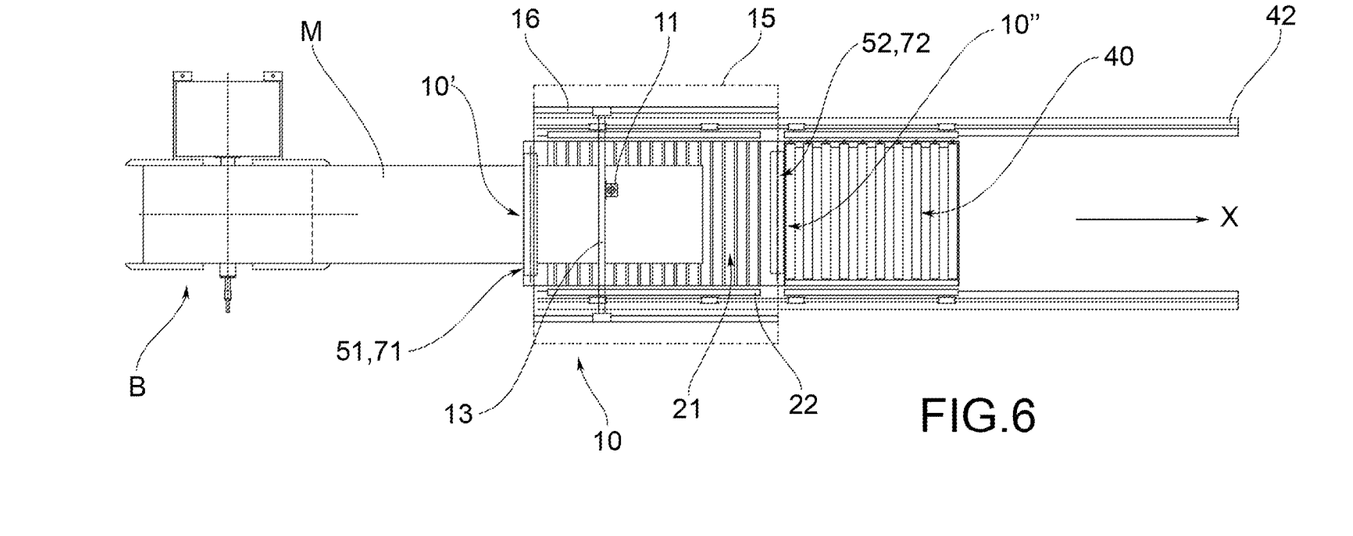

An example of this apparatus intended for machining material wound in a coil is shown schematically in FIGS. 1 and 2, where the laser cutting station is indicated at A and the spike bed is indicated at F.

In general, in cutting apparatuses of this type, the cutting station A comprises at least one laser or plasma cutting head T with Cartesian axis handling means H. The spike bed conveyor is integrated into the support structure of the cutting station, which supports the handling means of the cutting head.

Generally, at the entrance and exit of the cutting station, the apparatus is further equipped with devices C adapted to close the cutting station A, once the laminar material (in the form of a coil or in single sheets) has been positioned inside the cutting station, ready to undergo cutting operations. These devices C are integrated into the support structure of the cutting station, which supports the handling means of the cutting head and the spike bed conveyor. They serve to isolate the cutting area wherein the laser or plasma cutting head T operates to prevent the escape of laser radiation or high-intensity rays that could be hazardous to operators. Operatively, when activated, these devices come into contact either with an abutment surface of the entrance or of the exit or directly with the laminar material.

It has been found that the vibrations generated by the movements of the cutting head affect the positioning of the laminar material on the spike bed. This phenomenon may be more pronounced when the machined laminar material is in the form of single sheets than when the machined laminar material is wound into a coil. In some cases, this may adversely affect the cutting precision.

In the technical field of reference, therefore, there is a need for laser or plasma cutting apparatuses equipped with a spike bed, wherein the cutting precision is less affectable by the movements of the cutting heads, especially when the laminar material to be machined is in the form of single sheets.

SUMMARY OF THE INVENTION

Therefore, the main object of the present invention is to eliminate all or part of the drawbacks of the prior art mentioned above, by providing an apparatus for laser or plasma cutting of pieces of laminar material that is equipped with a spike bed and the cutting precision of which is less affectable by the movements of the cutting heads.

A further object of the present invention is to provide an apparatus for laser or plasma cutting of pieces of laminar material that is simple and economical to implement.

BRIEF DESCRIPTION OF THE DRAWINGS

The technical features of the invention, according to the aforesaid objects, are clearly apparent from the contents of the claims provided below and the advantages thereof will become more apparent in the following detailed description, made with reference to the accompanying drawings, which represent one or more purely illustrative and non-limiting embodiments thereof, wherein:

DETAILED DESCRIPTION

The apparatus for laser or plasma cutting of pieces of laminar material according to the invention shall be indicated collectively at 1 in the accompanying Figures.

Here and in the description and claims that follow, reference will be made to the apparatus 1 in the condition of use. It is in this sense that any references to a lower or upper position, or to a horizontal or vertical orientation, are therefore to be understood.

The cutting apparatus 1 according to the invention may be used to machine both laminar material wound in a coil and laminar material in the form of individual sheets.

According to a general embodiment of the invention, the apparatus 1 comprises a cutting station 10, which in turn comprises:

a first support structure 16 and
at least one laser or plasma cutting head 11.

The aforesaid at least one cutting head 11 is associated with the first support structure 16 and may be moved relative thereto within an cutting operating area 12.

As illustrated in the accompanying Figures, the cutting station 10 also comprises a protection cabin 15 that encloses the aforesaid cutting operating area 12.

Preferably, the protection cabin 15 is defined by a plurality of side walls and a cover, arranged as a protection and shield for the cutting operating area 12.

On the protection cabin 15 there is made a first opening 10' for the entrance of the laminar material in the cutting operating area 12 and a second opening 10" for the exit of the laminar material from the cutting operating area 12.

In particular, the operation of the cutting station 10 may be of traditional type (for example, as described in the Italian patent IT1409876, which is incorporated by reference herein) and will not be described in detail, being well known per se to a person skilled in the art.

In particular, the cutting station 10 may comprise two or more laser or plasma cutting heads 11. Also, the handling means 13 of the single cutting head 11 or of the plurality of cutting heads (if provided) are of the traditional type and thus will not be described in detail. In the case of a single cutting head, as shown in the accompanying Figures, these handling means may be of the Cartesian axis type (as shown in the accompanying Figures) or may consist of a robotic arm.

The cutting apparatus 1 further comprises means 21 for positioning at least one portion of laminar material (in the form of single sheets or a coil) in the aforesaid operating area 12 on a cutting plane m, preferably horizontal.

More specifically, these positioning means consist of a conveyor belt 21 of the "spike bed" type.

A conveyor belt of the "spike bed" type is well known to a person skilled in the art and will therefore not be described in detail. We limit ourselves here to recalling that a spike bed is a movable support structure, consisting of a conveyor belt defined by rods transverse to the advancement direction of the belt and spaced apart from one another. Each rod has a row of protruding points on which the laminar material rests. This type of conveyor belt prevents burning of the laminar material in the areas of contact between the material and the movable support. The movement of the conveyor belt is entrusted to a plurality of support wheels/rollers, at least one of which is motorized. In the accompanying Figures, the wheels/rollers are indicated at 24.

As schematically illustrated in FIGS. 3 to 8, the cutting apparatus 1 further comprises:

a first closing device 71 suitable to close the aforesaid first opening 10'; and
a second closing device 72 suitable to close the aforesaid second opening 10".

Operatively, both closing devices 71 and 72 serve to isolate the cutting zone wherein the laser or plasma cutting head 11 operates to prevent the escape of laser radiation or high-intensity rays that could be hazardous to operators. Operatively, when activated, these devices come into contact either with an abutment surface or directly with the laminar material.

Preferably, each of the aforesaid closing devices 71 and 72 is made in accordance with that which is described in the European Patent Application No. EP3342532A1 in the name of the same applicant, the entirety of which is incorporated herein by reference.

More specifically, in accordance with a preferred embodiment not illustrated in detail in the accompanying Figures, each closing device 71 and 72 comprises a bar that is arranged transversely to the advancement axis of the laminar material through the cutting station. The longitudinal edges of a steel plate, folded in a U-shape and affected by a plurality of transverse incisions terminating before the edges, are bound to the lower edges of the vertical side surfaces of this bar. Operatively, this folded U-shaped plate is deformable and is intended to be pressed against the laminar material or against an abutment surface (in the case wherein the material to be cut is in the form of single sheets and not in coils) to create a barrier. For this purpose, the device is equipped with vertical handling means of the aforesaid bar, preferably controllable automatically.

Advantageously, as illustrated in particular in FIGS. 3 to 8, in particular when the cutting apparatus 1 is intended to process laminar material wound in a coil, the apparatus 1 may comprise—upstream of the first entrance opening 10'—means 51 for guiding and straightening on the cutting plane m the laminar material M coming from a coil B along a longitudinal advancement direction X of the material. Advantageously, the apparatus 1 may also comprise—downstream of the second exit opening 10"—means 52 for extracting the laminar material M from the cutting operating area 12, along the longitudinal advancement direction X of the material.

The aforesaid guiding and straightening means 51, and the aforesaid extracting means 52 are also known per se to a person skilled in the art and will not be described in detail.

According to the invention, the aforesaid conveyor belt 21 is associated with a second support structure 22 which is mechanically separate and independent from the aforesaid first support structure 16.

According to the invention, also the aforesaid first and second closing devices 71, 72 are associated with a support structure mechanically separate and independent of the first support structure 16, i.e. the structure that supports the cutting head 11.

In particular, defining a support structure as "mechanically separate and independent" from the first support structure means that this support structure performs its support function without requiring the contribution of the first structure, as they are disconnected from each other.

Due to the fact that second support structure 22 (i.e. the structure which in particular supports the spike bed conveyor 21) and the support structure, to which these first and second closing devices 71, 72 are associated, are mechanically separate and independent of the first support structure 16 of the cutting station 10 (structure to which the aforesaid at least one cutting head 11 is associated), the transmission of vibrations from one structure to another is avoided or at least significantly reduced.

In this way, neither the spike bed 21 nor the closing devices 71 and 72 (which may come into contact with the laminar material during cutting operations) transmit vibrations to the laminar material, or at least only transmit a significantly reduced part thereof compared to traditional apparatuses.

Due to the invention, it is thus possible to obtain a cutting precision of the apparatus 1 that is less influenceable by the movements of the cutting heads compared to similar traditional cutting apparatuses.

The positive effects on the cutting precision that may be obtained with the cutting apparatus 1 according to the invention are found both when the laminar material to be machined is in the form of single sheets, and when the laminar material to be machined is continuously unwound from a coil.

The positive effects on cutting precision allowed by the invention when the laminar material to be machined in the form of individual sheets are particularly noteworthy. In effect, in this case, the individual sheets of laminar material are simply placed on the spike bed and, not actually being locked in position, are more easily subject to movements induced by vibrations.

The positive effects on cutting precision allowed by the invention are also appreciable when the laminar material to be machined is continuously unwound from a coil. In this case, unlike the individual sheets, it is not simply placed on the spike bed, but is also guided by the coil unwinding means and is therefore less subject to displacements. However, it is in contact with the closing devices 71 and 72 during cutting operations. In the traditional solutions, as already mentioned, these closing devices are mechanically connected to the support structure of the cutting head and become, inevitably, elements of transmission of vibrations to the laminar material. Although guided, the laminar material then receives vibrations from these devices. In the apparatus according to the invention, this situation is avoided, by eliminating, or at least reducing, also this part of vibrations transmitted to the laminar material.

The elimination, or at least the reduction, of vibrations transmitted to the material by the aforesaid closing devices 71, 72 is also useful when the laminar material is in the form of single sheets, when these sheets have a length greater than the cutting area and, protruding from the exit and/or the entrance, are therefore engaged by the closing devices.

Preferably, as illustrated in FIGS. 3 to 8, the support structure with which the first and second closing devices 71, 72 are associated coincides with the second support structure 22, i.e. the support structure of the spike bed conveyor 21.

As shown in FIGS. 3 to 6, the aforesaid protection cabin 15 may be mechanically integrated into the first support structure 16. In this case, the support structure of the spike bed conveyor 21 and the aforesaid first and second closing devices 71, 72 are also mechanically separate from the protection cabin 15.

Figure 7:
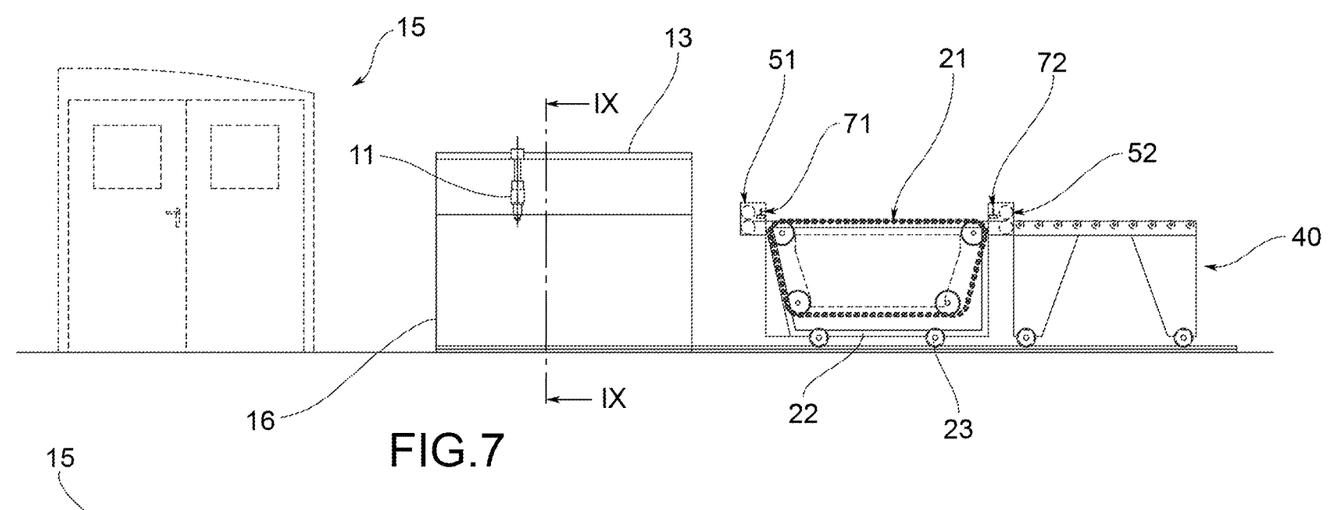
FIGS. 7 and 8 show respectively a schematic orthogonal view in elevation and from above of an apparatus for laser or plasma cutting of pieces of laminar material in accordance with a second embodiment of the present invention wherein not only the spike bed, but also the protection cabin is mechanically independent of the support structure of the cutting head, such apparatus being illustrated partially exploded, i.e. with the spike bed and protection cabin physically separated from the support structure of the cutting head.
Figure 8:
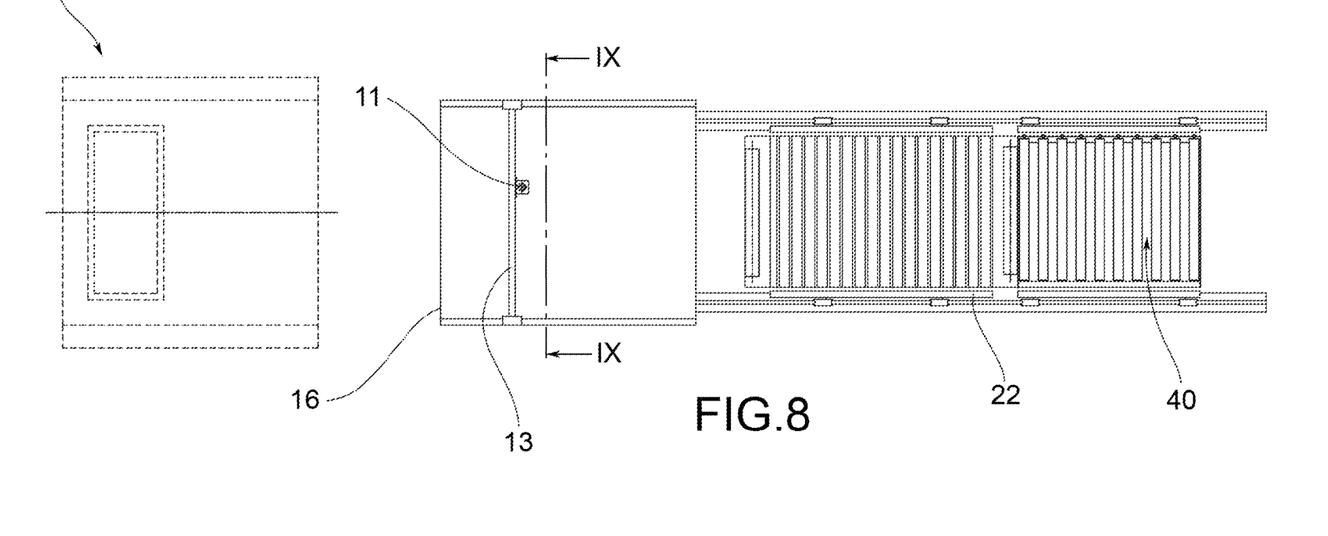
Figure 9:
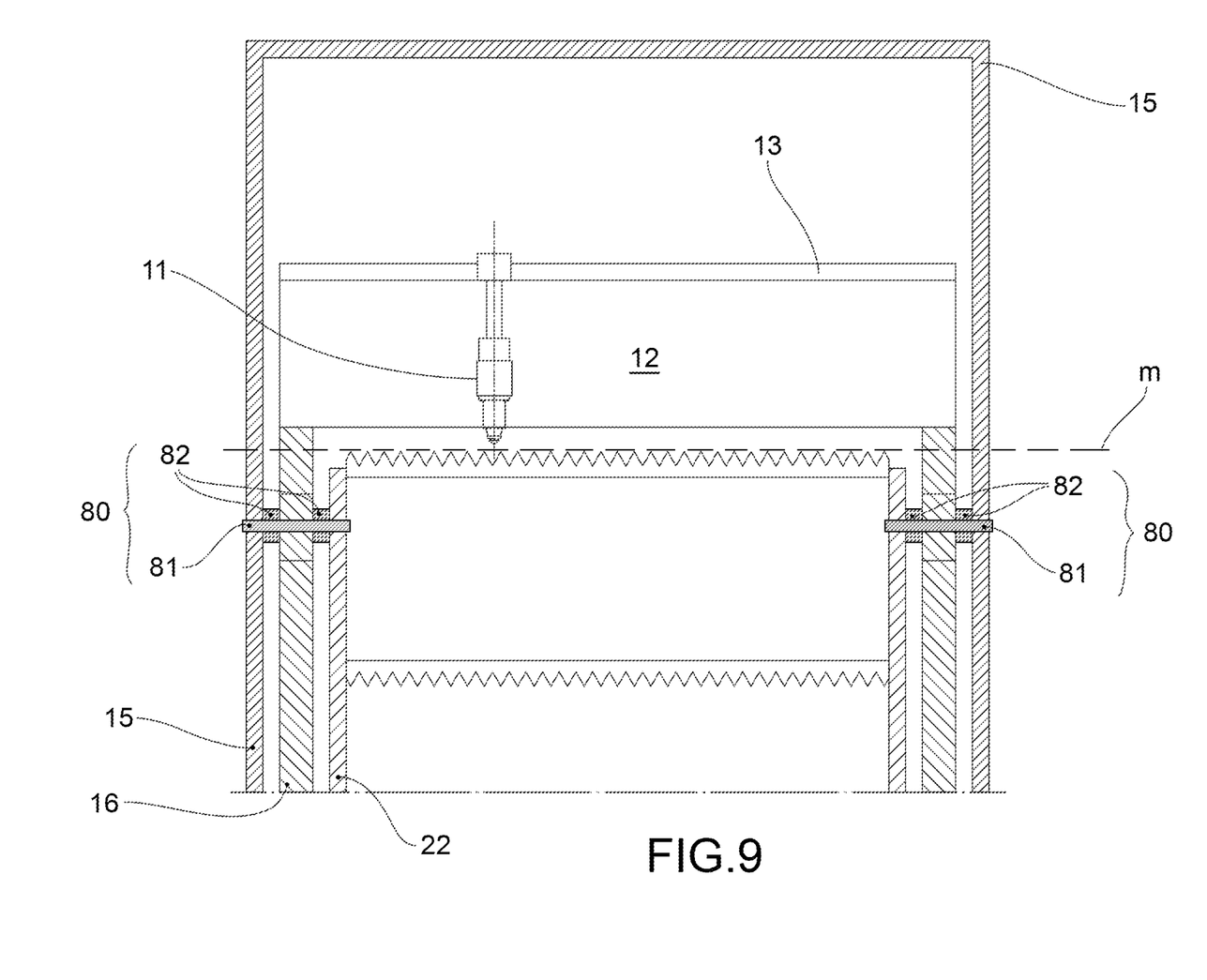
FIG. 9 shows a cross-sectional view of the cutting station of the cutting apparatus in accordance with the embodiment of FIGS. 7 and 8, illustrated in assembled condition and in configuration for transport, the section being drawn according to the sectional plane IX-IX indicated in FIGS. 7 and 8.

In accordance with the embodiment illustrated in FIGS. 7, 8 and 9, also the protection cabin 15 may be mechanically separate and independent of the aforesaid first support structure 16. In this case, the support structure with which the aforesaid first and second closing devices 71, 72 are associated coincides either with the second support structure 22 or with the protection cabin 15.

Advantageously, as illustrated in the accompanying Figures, the aforesaid second support structure 22 with the associated spike bed conveyor 21 (and possibly with the associated first and second closing devices 71, 72) may be completely extractable from the aforesaid cutting station 10 and may constitute an operative unit independent from the cutting station 10.

Advantageously, the aforesaid cutting station 10 may be provided with an external access opening 14 to the cutting operating area 12 through which said second support structure 22 with the associated conveyor belt 21, (and possibly with the associated first and second closing devices 71, 72), may be inserted and extracted from the cutting station 10.

In accordance with a particularly preferred embodiment, illustrated in the accompanying Figures, the second support structure 22 comprises a carriage 23 for the handling of the entire second support structure and the associated conveyor belt 21 with respect to the cutting station 10. In particular, as illustrated in FIGS. 3 to 8, the second support structure 22 may be guided slidably in its entrance and exit movement from the cutting station 10 by the aforesaid carriage 23 on a track 42.

Operatively, due to the conveyor belt 21 and the second support structure 22 thereof forming an operative unit separable from the cutting station 10, the cutting station 10 may be used in combination with other types of positioning means of the laminar material, as an alternative to the spike bed conveyors.

In particular, the cutting station 10 may be used in combination with positioning means suitable to keep the laminar material stretched in the air, without any lower support, by means of slidable manipulation devices. An example of such positioning means is described in the Italian patent IT1409876, which is incorporated herein by reference.

Preferably, as illustrated in the accompanying Figures, similarly to the aforesaid first and second closing devices 71, 72, also the aforesaid means 51 for guiding and straightening the laminar material M on the cutting plane m, as well as the means 52 for extracting the laminar material M from the cutting operating area 12 (if provided) are associated with a support structure that is mechanically separate and independent of the first support structure 16. In this way it is prevented that also these means 51 and 52 can transmit vibrations to the laminar material during cutting operations and thus affect the cutting precision.

Preferably, the support structure to which the aforesaid guiding and straightening means 51 and the extracting means 52 are associated coincides with the second support structure 22, i.e. the structure that supports the spike bed conveyor.

In accordance with the embodiments illustrated in the accompanying Figures, the two closing devices 71, 72, the guiding and straightening means 51 and the extraction means 52 are all associated with the same support structure, which preferably coincides with the second support structure 22, i.e. with the structure that supports the spike bed conveyor.

Advantageously, the first support structure 16 (structure to which the aforesaid at least one cutting head 11 is associated) and the second support structure (structure supporting the spike bed conveyor 21 and possibly the closing devices 71 and 72, as well as possibly the means 51, 52) may be mechanically constrained to each other in a reversible way by mechanical connection means 80, which are able to hold the two support structures 16, 22 in predefined relative positions during a transport phase of the apparatus 1 from one site to another.

In particular, as shown in FIG. 9, such mechanical connection means 80 may consist of:

one or more pins 81 that transversely connect the two structures 16 and 22 at the appropriate through-holes obtained in the structures 16 and 22; and one or more spacers 82, interposed between the supporting structures, in order to lock the relative positions thereof.

Preferably, the spacers 82 are engaged by the pins 81.

The presence of such mechanical connection means 80 allows the two structures 16 and 22 to be joined together temporarily so as to allow the transport as a unit of at least the cutting station, without however modifying the relative positions between the two structures.

Operatively, the first structure 16 must in effect have a predefined position with respect to the second structure 22, as a function of which the operative system for managing the cutting head is calibrated. This predefined position therefore constitutes a factory setting. Being able to transport the apparatus 1, or at least the cutting station, from the factory to the operative site without losing this setting significantly simplifies the operation of the apparatus 1.

If the protection cabin 15 is mechanically integrated into the first support structure 16, the cabin itself may either be transported directly mounted together with the first support structure 16 or be mounted thereon at the operative site.

If, instead, also the protection cabin 15 is mechanically separate and independent of the first support structure 16, the protection cabin 15 also may be constructed in such a way as to be mechanically constrainable in a reversible way to the first support structure 16 and/or the second support structure 22 by means of the aforesaid mechanical connection means 80 (as shown in FIG. 9). These mechanical connection means are suitable to hold the protection cabin 15 in a predefined relative position with respect to one or both of the two support structures 16, 22 during a transport phase of the apparatus 1 from one site to another.

Advantageously, as illustrated in the accompanying Figures, the cutting apparatus 1 may comprise a third support structure 40, which is located downstream of the cutting station 10 and defines a support plane for the laminar material moved by the conveyor belt 21 out of the cutting station 10.

Preferably, the support plane for the laminar material leaving the cutting station 10, defined by this third support structure 40, is substantially coplanar with the aforesaid cutting plane m.

Preferably, as illustrated in FIGS. 3 to 8, the aforesaid third support structure 40 consists of a roller table.

In accordance with a preferred embodiment, the aforesaid third support structure 40 comprises a carriage 41 for the handling of this third support structure with respect to the cutting station 10.

In particular, as illustrated in the accompanying FIGS. 3 to 8, the aforesaid third support structure 40, equipped with a carriage 41, may be integrated with the second support structure 22 (to which is associated the spike bed conveyor 21) so that they may be moved together.

The invention allows many advantages already partly described to be obtained.

The apparatus for laser or plasma cutting of pieces of laminar material according to the invention—even if equipped with a spike bed—has a cutting precision less influenceable by the movements of the cutting heads.

In effect, due to the separation and independence between the first support structure of the cutting station and the structures or structure that support the spike bed conveyor 21 and the closing devices 71 and 72 (and possibly also the means 51 and 52), the transmission of vibrations from one structure to another, and therefore the transmission of vibrations from the cutting head to the laminar material, is significantly reduced.

This eliminates, or at least significantly reduces, the risk of the vibrations generated on the first support structure by the movements of the cutting head being transmitted to the laminar material resting on the spike bed and causing relative movements between the laminar material and the spike bed during cutting operations on the laminar material.

Due to this invention, the cutting precision is improved, being the number of devices used equal (cutting heads, spike bed, closing devices, guiding means and extracting means).

Finally, the apparatus according to the invention is simple and economical to implement, since it does not require the installation of much more complex systems than traditional technical solutions.

The invention thus conceived therefore achieves the foregoing objects.

Obviously, in its practical implementation, it may also be assumed to take on embodiments and configurations other than those illustrated above without departing from the present scope of protection.

Moreover, all details may be replaced by technically equivalent elements, and the dimensions, shapes and materials used may be of any kind according to the needs.

What is claimed:

1. An apparatus for laser or plasma cutting of pieces from a laminar material, comprising:
   a cutting station, which comprises a first support structure and at least one laser or plasma cutting head which is associated with said first support structure and which is movable relative to said first support structure within an operating area, said cutting station further comprising a protection cabin which encloses said operating area;
   a positioning element configured to position at least a portion of said laminar material in said operating area on a cutting plane, wherein said positioning element comprises a spiked bed conveyor belt; and
   a first closing device configured to close a first opening made in said protection cabin for the entrance of the laminar material into the operating area and a second closing device configured to close a second opening made in said protection cabin for the exit of the laminar material from the operating area;
   wherein said conveyor belt is associated with a second support structure that is not in physical contact with said first support structure;
   wherein said first and said second closing devices are also associated with a support structure that is not in physical contact with said first support structure;
   wherein said first support structure and said second support structure may be mechanically constrained to each other in a reversible manner by a mechanical connection configured to retain the two support structures in predefined relative positions during a transport phase of said apparatus from one site to another; and
   wherein said protection cabin is mechanically separate and independent of said first support structure, and said protection cabin may be mechanically and reversibly constrained to said first support structure, to said second support structure, or to both support structures by said mechanical connection, said mechanical connection being further configured to retain the protection cabin in a predefined relative position with respect to one or both support structures during the transport phase of said apparatus from one site to another.

2. The apparatus according to claim 1, wherein said first and said second closing devices are associated with said second support structure.

3. The apparatus according to claim 1, wherein said protection cabin is mechanically separate and independent of said first support structure, and
   wherein said first and said second closing devices are associated with said second support structure or with said protection cabin.

4. The apparatus according to claim 1, wherein said second support structure and the associated conveyor belt are fully extractable from said cutting station.

5. The apparatus of claim 4, wherein the first and second closing devices are extractable with said second support structure and the associated conveyor belt.

6. The apparatus according to claim 4, wherein said cutting station is provided with an external access opening to the operating area through which said second support structure and the associated conveyor belt may be inserted and extracted from the cutting station.

7. The apparatus according to claim 1, further comprising:
   means for guiding and straightening the laminar material on the cutting plane upstream of the first opening; and
   means for extracting the laminar material from the operating area downstream of the second opening.

8. The apparatus according to claim 7, wherein said means for guiding and straightening and said means for extracting are both associated with a support structure mechanically separate and independent of said first support structure.

9. The apparatus according to claim 8, wherein said means for guiding and straightening and said means for extracting are both associated with said second support structure.

* * * * *